Oct. 12, 1926.  
E. THOMSON  
1,603,221  
METHOD AND APPARATUS FOR MAKING GLASS  
Filed Jan. 25, 1924
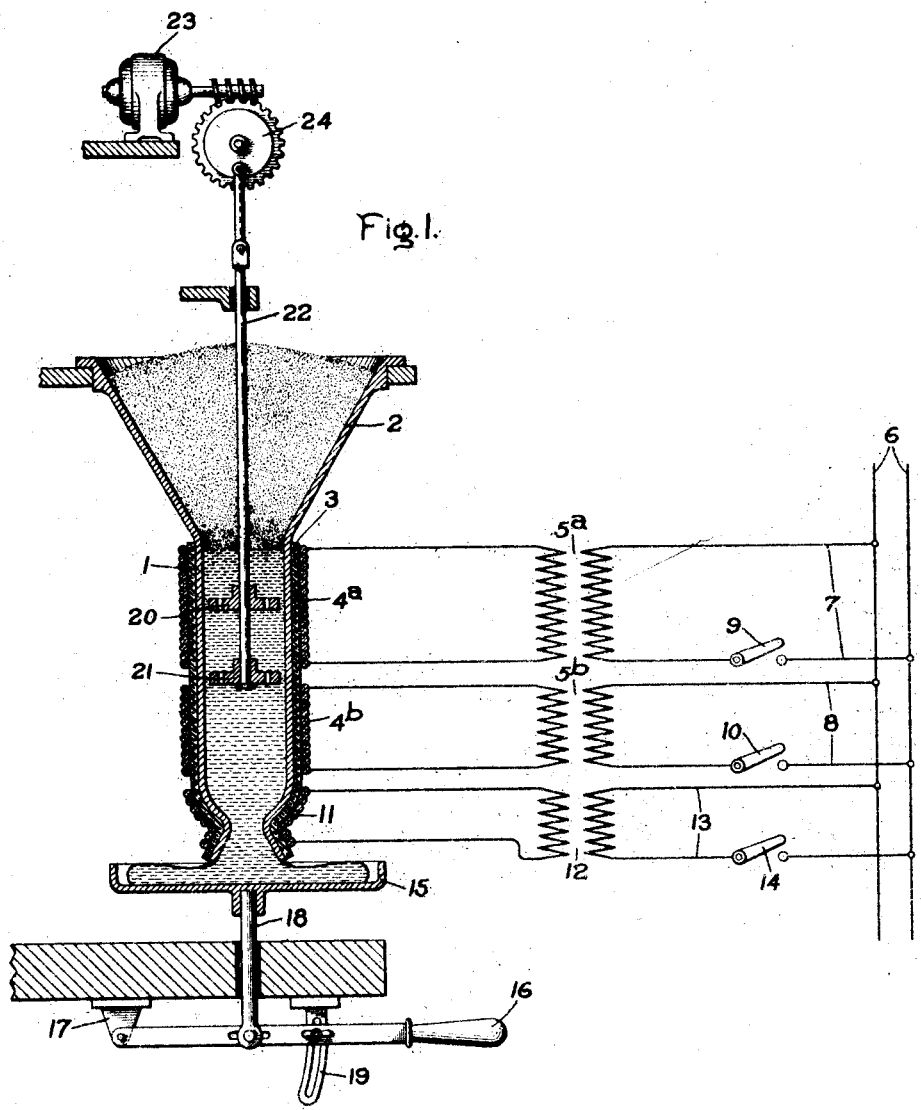
Fig.1.
Fig.2.
Fig.3.
Inventor:  
Elihu Thomson,  
by *[signature]*  
His Attorney.

Patented Oct. 12, 1926.

1,603,221

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

METHOD AND APPARATUS FOR MAKING GLASS.

Application filed January 25, 1924. Serial No. 688,603.

The present invention comprises a method and apparatus for making high grade glass which is especially suitable for optical purposes.

In the construction of optical instruments it is desirable to reproduce glasses without varying their composition. A slight change in composition will so change the physical constants of the glass that the curves of the surfaces will require recalculation and new lens-making tools are required to suit the changed product.

When using an ordinary glass crucible some of the material of the crucible is fluxed into the melt and thereby changes its composition. Hence, no two melts, no matter how carefully they are matched in materials, will be alike. Every melt stands by itself and furnishes a limited amount of glass of a certain optical quality.

Another difficulty encountered in the manufacture of optical glass is the occurrence of striæ in the glass even when great care is exercised to use pure materials and to get a uniform composition as by melting in a platinum crucible. These striæ appear to be due to an inevitable variation of composition at the surface of the melt due to obscure causes, perhaps by volatilization of some of the constituents. When the glass is cast the surface layer is partially mixed with or folded into the body of the melt, producing striations. To avoid these striations it is necessary to let the melt cool in the crucible and then to crack the crucible, or actually cut it out of a metal crucible after hardening therein.

It is the object of my invention to provide a process of making glass, which is capable of repeated operation, and whereby glass having uniform optical properties and being free from striations may be produced.

In accordance with my invention, a mixture of glass making constituents is heated in a container consisting of material not attacked by these constituents or the glass compositon resulting therefrom, and provision is made for protecting the melt from the atmosphere. The fusion from this zone is withdrawn at a point removed from the entry of the raw materials. My invention also includes a new apparatus whereby this method may be carried out.

The accompanying drawing shows in Fig. 1 somewhat diagrammatically in vertical section an apparatus forming a part of my invention; Fig. 2 shows a cast lens blank; and Fig. 3 is a cross-section of the finished product.

The apparatus in which the glass-making constituents are caused to react and fuse is constituted in the example of my invention shown in the drawing by the tubular crucible 1, consisting of platino-iridium or other suitable material. It is provided at the top with a charging hopper 2 which is ordinarily charged with enough of the raw glass-making constituents to protect the upper surface of the melted portion within the upright tubular portion 1. The tubular portion 1 of the container is surrounded by a layer of insulating material 3 consisting of finely divided quartz cemented by clay or the like, upon which is wound an electric heater which may be arranged in two sections, $4^a$ and $4^b$, which are respectively attached to the secondaries of the transformers $5^a$ and $5^b$. The primaries of these transformers derive energy from a common supply circuit 6. These primary circuits which are respectively numbered 7 and 8, each contain individual switches 9 and 10 so as to permit a regulation of the heating effect upon the crucible.

The heating means for the glass-making reaction has been shown for illustrative purpose as being constituted by a resistor. Other known heating means as for example, a high frequency induction heater, may be used. Northrup Patents No. 1,286,394 and No. 1,286,395 describe an induction furnace of this type.

The crucible may be lined with precious metal instead of consisting entirely of precious metal. For example, a tungsten crucible lined with platinum-iridium may be used.

The lowermost part of the crucible 1 has a somewhat contracted neck through which the glass melt is discharged. Adjacent the discharge opening is provided a separate heater winding 11, which is connected to a separate transformer 12 having circuit connections 13 to the energy source 6 and also containing the switch 14. The downwardly projecting discharge opening at the lowermost end of the crucible is closed by a reciprocating casting table 15. When glass is to be cast, this table is lowered by the lever 16, which is mounted at one end upon a fixed support 17 and connected to the casting table by a link 18. A guide 19 serves to steady the lever.

Within the upright cylindrical portion of the melting crucible are placed a pair of stirring vanes 20, 21, which are mounted upon a rod 22. This rod is given an up and down motion by the motor 23, which is connected to the rod 22 by suitable gearing 24. When heat is applied to the melting zone of the crucible, the stirring apparatus is caused to oscillate up and down so as to thoroughly mix the constituents and to remove bubbles from the melt.

Below the reaction zone which is heated by the coil $4^a$ and in which the stirring devices operate is a clearing zone which is heated by the heater section $4^b$, and can be heated to a higher temperature than the remaining parts of the apparatus without exposing the melted mass to the air or other deleterious influences. When the chemical reaction between the glass-making constituents has been completed, which is known by experience, the temperature in the clearing zone is raised sufficiently high to remove any remaining bubbles in the glass and then the temperature is somewhat lowered by opening the switch 10 and the temperature of the lowermost portion of the crucible is raised by the heater coil 11 so that when the table 15 is lowered the molten mass of glass can escape from the crucible, as indicated in the drawing. After a desired quantity of the glass has been cast the switch 14 in the supply circuit of the heater 11 is opened causing the glass melt in the neck to again solidify and the table 15 is raised to permit of the renewed operation of the apparatus with a new batch of glass-making material. In this way the production of glass can go on almost steadily, the raw material being fed into the hopper 2 in a state of thorough mixture while the glass can be cast at intervals in slabs for annealing, molding and other purposes. After the casting operation the ingot of glass upon the casting table 15 may be cut off from the glass in the neck of the crucible by well known methods, giving a rough blank of glass as shown in Fig. 2. Succeeding blanks of glass produced in this way can be cut and ground into lens (Fig. 3) or other optical forms with the assurance that the composition will be absolutely uniform and that striations in the glass will be absent.

What I claim as new and desire to secure by Letters Patent of the United States is:—

1. The method of making glass which consists in feeding glass-making material downwardly into a reaction zone, heating the material in said zone to fusion while protecting the upper zone of said material with unfused material and casting said material downwardly when a clear, glassy material has been formed.

2. The method of making optical glass free from striæ which consists in heating glass-making constituents to fusion in a refractory container, which is inert with respect to said constituents, protecting the surface of said fusion from the atmosphere by unfused glass-making constituents of the same composition and discharging the material from said zone without mingling the surface layer with the main body of said material.

3. The method of making glass which consists in feeding glass-making constituents into an inert container, heating a part of said constituents to a sufficiently high temperature to produce a glass, protecting said glass from contact with the atmosphere by an excess of said contituents, and withdrawing a part at least of said glass at a point removed from the introduction of said constituents.

4. An apparatus for producing optical glass which consists in the combination of a refractory metal container, means for charging raw material into said container, means for heating said container, means remote from said charging means and acting to close a discharge opening, said means being removable and being adapted for receiving fused material, and means for applying heat at said discharge duct.

5. An apparatus for producing optical glass which consists in a vertical tubular container having openings at opposite ends, said container consisting of a noble metal, means for electrically heating said container, a feeding hopper communicating with the upper opening of said container, means for agitating a charge in said container, a charge-receiving table and means for moving said table from a position closing said lower opening, and a lower position, uncovering said opening to permit a charge to collect upon said table.

In witness whereof, I have hereunto set my hand this 21st day of January, 1924.

ELIHU THOMSON.